United States Patent [19]

Voss et al.

[11] Patent Number: 4,856,978
[45] Date of Patent: Aug. 15, 1989

[54] APPARATUS FOR CONVEYING PREFORMS

[75] Inventors: Hermann Voss, Seevetal; Manfred Mank, Hamburg, both of Fed. Rep. of Germany

[73] Assignee: Hermann Berstorff Machinenbau GmbH, Hanover, Fed. Rep. of Germany

[21] Appl. No.: 239,533

[22] Filed: Sep. 1, 1988

[30] Foreign Application Priority Data

Sep. 3, 1987 [DE] Fed. Rep. of Germany ....... 3729452

[51] Int. Cl.⁴ .............................................. B29C 49/68
[52] U.S. Cl. .................................... 425/526; 198/377; 198/415; 264/535; 425/534
[58] Field of Search ........ 425/526, 528, 534, 538–541, 425/537; 264/535, 538, 543; 198/377, 415, 627

[56] References Cited

U.S. PATENT DOCUMENTS

| | | | |
|---|---|---|---|
| 1,361,970 | 12/1920 | Dickey | 198/627 X |
| 3,101,836 | 8/1963 | Roundtree, Jr. | 198/415 X |
| 3,587,824 | 6/1971 | Rochla | 198/377 |
| 3,608,696 | 9/1971 | Lagermasini et al. | 198/415 X |
| 3,723,230 | 3/1973 | Troutner | 198/627 X |
| 4,050,887 | 9/1977 | Berggren et al. | 264/535 X |
| 4,164,281 | 8/1979 | Schnier | 198/415 X |
| 4,362,498 | 12/1982 | Harry et al. | 425/534 X |
| 4,382,760 | 5/1983 | Wiatt et al. | 425/534 X |
| 4,451,426 | 5/1984 | Branchadell | 425/526 X |
| 4,511,025 | 4/1985 | Nakayama | 198/377 |
| 4,530,694 | 7/1985 | Kobler et al. | 198/377 X |

Primary Examiner—Richard L. Chiesa
Attorney, Agent, or Firm—Foley & Lardner, Schwartz, Jeffery, Schwaab, Mack, Blumenthal & Evans

[57] ABSTRACT

An apparatus is provided for the conveyance of preforms through a heating station to a stretching and blowing machine during the production of hollow articles from thermoplastic plastics materials, means of which preforms having different neck diameters can be heated satisfactorily and extremely uniformly without major modification of the apparatus. This is achieved by providing two endless toothed sections extending parallel to each other and have preform pick-up means mounted thereon. The preforms are collected and retained in position by the pick-up means as they pass through the heating station. The mutual spacing of the belts and, hence, of the pick-up means from one another and from the heating devices is adjustable. A further pair of endless drive belts are provided which rotate the preforms at desired circumferential speed about their own axes as they pass through the heating device so as to promote an even distribution of the heat in the preforms.

5 Claims, 4 Drawing Sheets

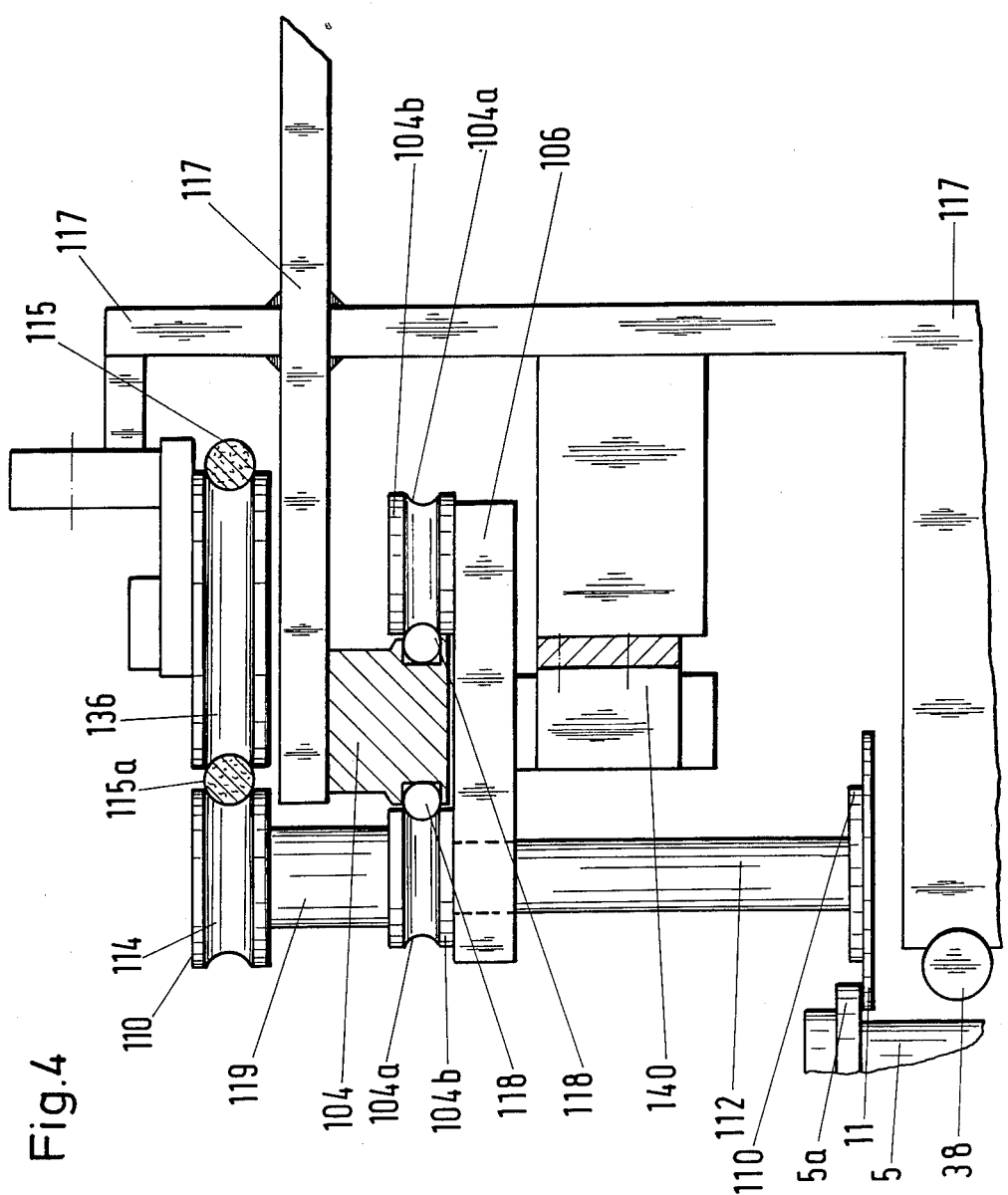

APPARATUS FOR CONVEYING PREFORMS

FIELD OF THE INVENTION

The present invention relates to an apparatus for conveying preforms. More particularly, the present invention relates to an apparatus for conveying preforms through a heating station during the production of hollow bodies from thermoplastic plastics materials.

BACKGROUND OF THE INVENTION AND PRIOR ART DISCUSSION

An apparatus for conveying preforms is disclosed in U.S. Pat. No. 4,382,760. In this prior specification, there is disclosed a pick-up chain, which receives preforms to be heated which are supplied thereto in a generally vertically downward direction. The preforms are received in circular openings which are not adjustable in respect of their diameter. By means of the chain, the blanks are then conveyed through a stretching and blowing machine.

Such a known arrangement has the disadvantage that it can only be used to produce containers or bottles of one specific size. This is because only blanks having a specific diameter fit into the receiver means, that is to say, the openings in the chain, for conveyance through the heating arrangement.

OBJECTS OF THE INVENTION

The present invention seeks to provide an apparatus for the conveyance of preforms through a heating station to a stretching and blowing machine which ensures that the preforms are heated completely uniformly therein. Such a measure is designed to permit hollow bodies having an extremely uniform wall thickness to be produced from the preforms. The present invention also seeks to provide an apparatus which is rapidly and easily adaptable to accommodate different sizes of preforms.

SUMMARY OF THE INVENTION

According to the present invention, there is provided an apparatus for the conveying of preforms through a heating station during the production of hollow bodies formed from thermoplastic plastics material, said preforms each including a support ring or collar, said conveying apparatus comprising a housing and conveyor means disposed within said housing, said conveyor means comprising a pair of endless toothed belts, said pair of belts being disposed parallel to, but spaced apart from one another to define a conveyor path therebetween, drive means associated with each belt for driving said belts in opposite directions to one another, whereby the surfaces of said belts defining said path are caused to travel in the same direction as one another, means for adjusting said spacing of said belts from one another, a plurality of bearing assemblies fixedly mounted on each of said belts, each said bearing assembly including a bearing ring, whereby, in use, pairs of said assemblies, comprising one assembly from each belt, cooperate with one another and jointly support and convey said preforms by engagement, form opposed sides, with said support ring or collar, means for rotating said bearing rings, said means for rotating comprising a further pair of endless drive belts, said further pair of drive belts extending parallel to, but spaced apart from, one another and parallel to, but vertically spaced from, said pair of toothed belts, said further pair of belts being disposed one on each side of said conveyor path, drive means associated with each belt of said further pair of belts for driving said belts in the same direction as one another whereby the surfaces of said belts facing said conveyor path travel, in use, in opposite directions to one another, means for adjusting said drive means for said further pair of belts, drive roller means co-operating with each said belt of said further pair of belts, said drive roller means being connected to each said bearing ring, and heating means for heating said preforms during said conveyance, whereby actuation of said toothed pair of belts causes support and conveyance of said preforms along said horizontal conveyor path and simultaneous actuation of said further pair of drive belts causes rotation of said preforms about their own axis during said conveyance.

The preforms can be satisfactorily heated utilising such an apparatus because of the disposition of the two opposed surfaces of the two endless toothed belts defining the conveyor path. These belts are drivable in opposite directions so that the opposed surfaces travel in the same direction as one another. The bearing assemblies mounted on the belt include bearing rings which support the preforms. The conveyor path situated between the opposed belt surfaces is linear and is adjustable, in respect of its width, together with heating arrangements. The uniform heating of the preforms is improved as a result of the continuous rotation thereof about their own axes as they pass through the heating station.

Pick-up means are mounted on the two endless toothed belts for collecting and retaining the preforms therebetween, starting from both surfaces and extending to the centre of the conveyor path. The pick-up means are formed by bearing rollers mounted on lugs and on which the protruding bearing ring is disposed. Each preform has a support ring or collar which rests, during conveyance, on two bearing rings disposed opposite each other and which are moulded to fit on their associated bearing rollers. This ensures an extremely stable and smooth conveyance, even at high speeds, of the preforms through the heating station.

The cover plates are mounted on the endless belts through the intermediary of retaining means. Guide rollers, which travel in guide rails provided are mounted on one face of the lugs remote from the preforms and the axles for the bearing rollers, which depend downwardly, are mounted on the other face of the cover plates. In one embodiment, a circular, circumferential, annular groove is provided in the lower portion of the bearing rollers adjcent to the bearing ring.

Endless drive belts, which have a circular cross-section and are connected to a steplessly adjustable drive, travel in the annular grooves provided in the bearing roller. Alternatively, a toothed belt may also be used. By means of this drive, the bearing roller can be set in rotational motion at a desired circumferential speed, such motion being transmitted to the preformed blank, so that the preform is rotated about its own axis as it travels through the heating device. This ensures that the heating of the preform is uniform.

To permit preforms of different diameters to be heated, the width of the conveyor path between the pairs of bearing rollers is steplessly adjustable. For this purpose, at least one spindle drive is connected to the toothed belts and moves them horizontally and at right angles relative to the direction of conveyance. The spindle drive or drives are screw-connected to the belts.

The spindle drive is actuatable by means of a hand crank which is mounted thereon. The width of the conveyor path being steplessly adjustable because of the provision of a left-hand thread on one-half of the spindle and a right-hand thread on the other half thereof.

The heating devices, for example, ceramic heaters, are also advantageously mounted on the belts, so that the spacing between the heating devices and the preforms remains identical, even if the preforms have a relatively large or a relatively small diameter. This also helps to ensure uniform heating.

BRIEF DESCRIPTION OF THE DRAWINGS

Two preferred embodiments of an apparatus according to the invention will be further described, by way of example, with reference to the accompanying drawings, in which:

FIG. 4 is a cross-sectional view similar to that shown in FIG. 3 but of an alternative embodiment of the conveyor arrangement.

DESCRIPTION OF PREFERRED EMBODIMENTS

Figure 1:
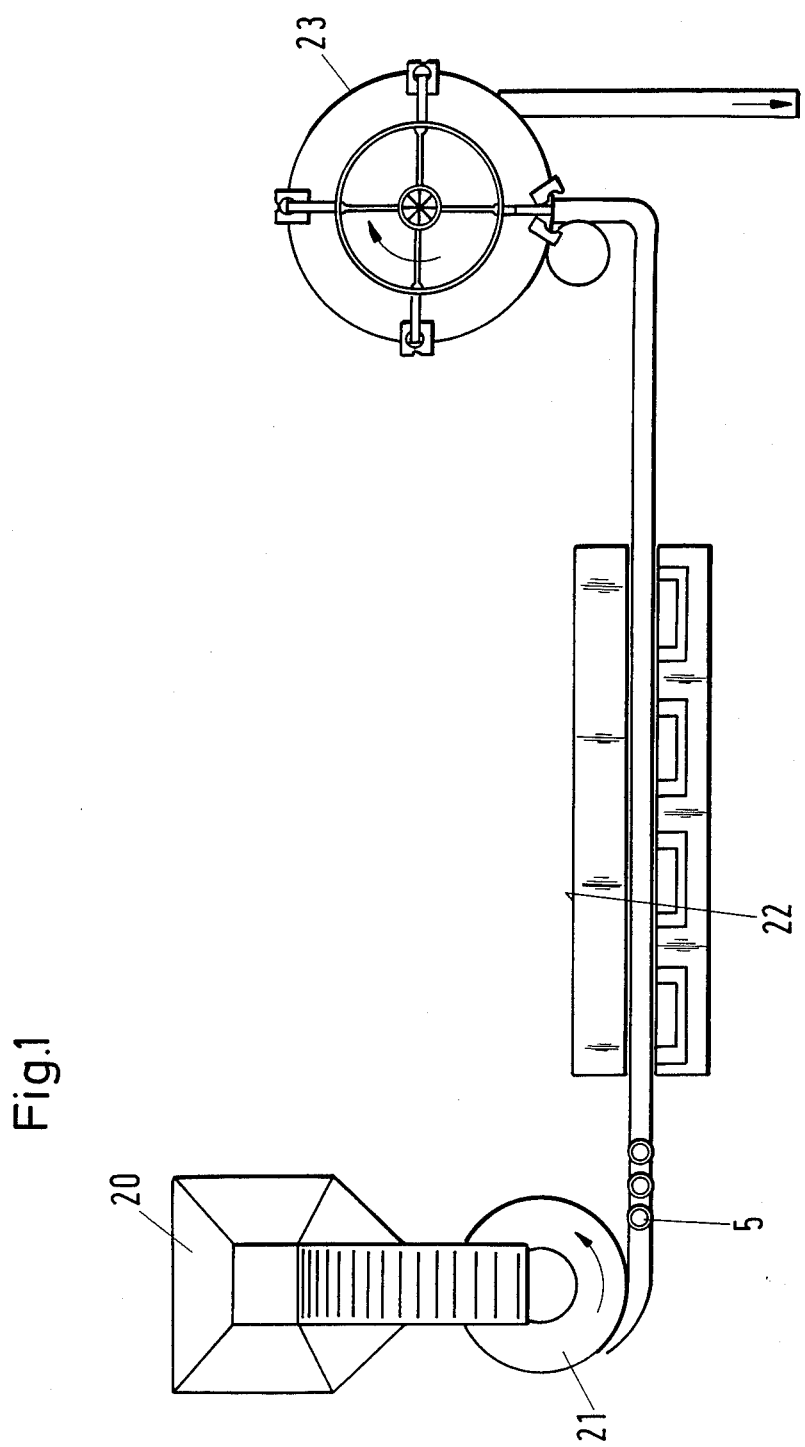
FIG. 1 is a schematic plan view of a re-heat and blow apparatus for the continuous production of bottles from thermoplastics materials, the apparatus including an apparatus for conveying bottle preforms through a heating station.

In FIG. 1, there is schematically shown a reheat and blow apparatus for producing thermoplastics material hollow articles such as bottles from injection moulded preforms 5. The preforms are introduced into a steeply-angled conveyor 20 which conveys them to a sorting device 21. The preforms 5 are then conducted to a heating station 22. After the heating process, the preforms are fed to a blowing device 23.

The heating station 22 comprises two endless toothed belts 1 and 2, the major surfaces of which are disposed vertically. The belts rotate around drive guide rollers 31 and 30 respectively and extend parallel to, but spaced apart from one another so as to define a gap therebetween. The opposed major surfaces defining such gap are designated 1a and 2a respectively. By rotating the rollers 30 and 31 in opposite directions, the surfaces 1a and 2a are caused to run in the same direction as one another.

The drive which ensures that the guide rollers 30 and 31 rotate in opposite directions but synchronously with one another comprises a drive 35, not shown in detail, which is mounted on a frame 17 of the station 22. Through the intermediary of a V-belt 34, the roller 31 is driven thereby. A belt 32, toothed on both sides, runs around one of each of the rollers 30 and 31, the passage of the belt between the driven roller 31 and the roller 30 including two additional guide rollers 33 mounted on the frame 17. The drive 35 is steplessly adjustable.

Figure 3:
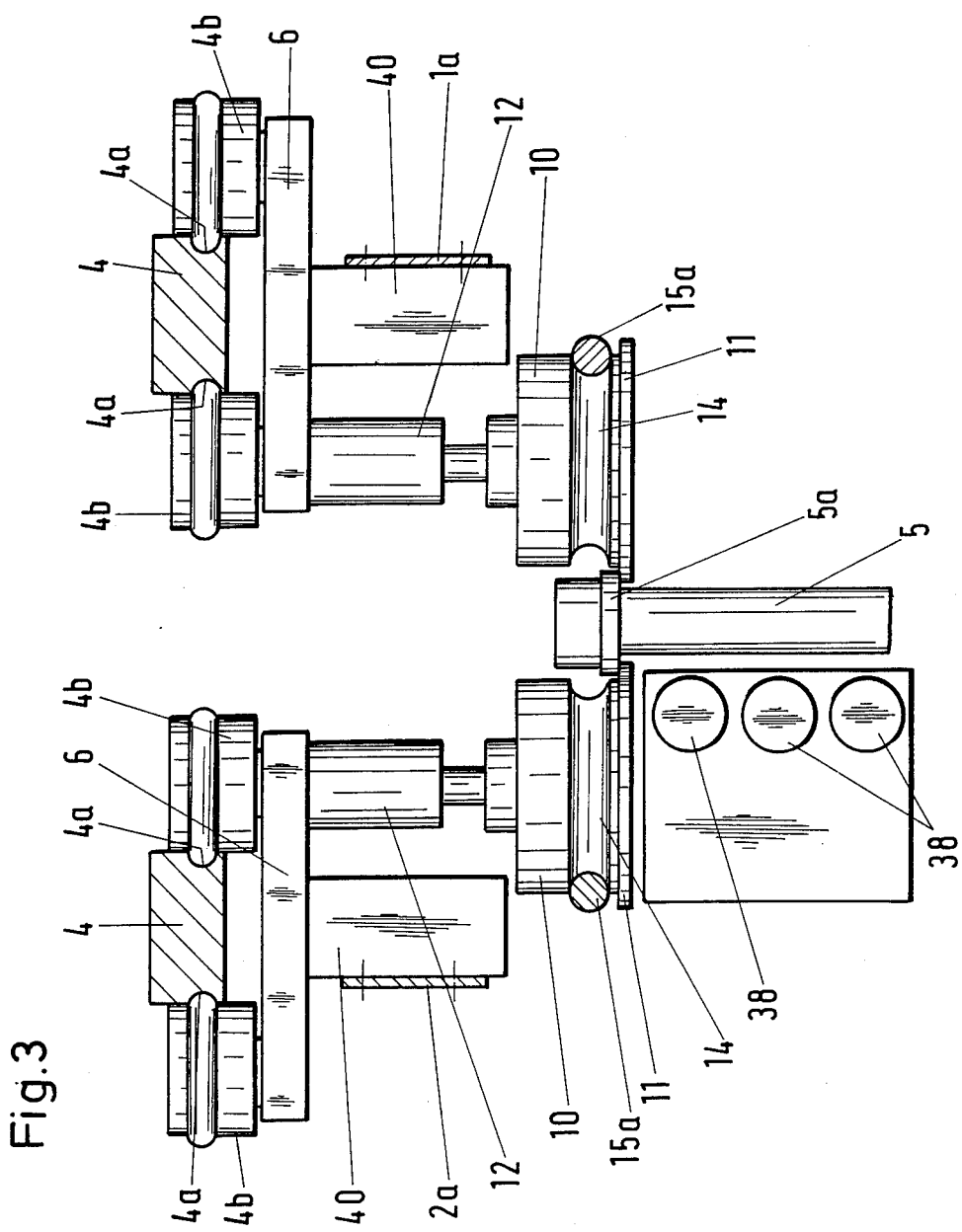
FIG. 3 is a cross-sectional view, again on an enlarged scale relative thereto, taken substantially along the line III—III of FIG. 2

As shown in FIG. 3, retaining means 40 are bolted onto the endless toothed belts 1 and 2 in close proximity to one another. A lug or cover plate 6 is mounted on the upper end of each of the retaining means 40. Guide rollers 4b are mounted on the lug 6, which guide rollers are located in a guide groove 4a formed in a guide rail 4 A bearing roller axle 12 is mounted on the opposed face of the lug 6 to the guide rollers 4b. A bearing roller 10 is situated on the lower end of the axle 12 and has a protruding, circumferential bearing ring 11. In use, two such arrangements, one formed on the belt 1 and the other formed on the belt 2 cooperate with one another such that a support ring or collar 5a formed on the preform 5 is supported on and between the bearing rings 11 of the two arrangements.

Above the bearing ring 11, which is moulded to fit on the bearing roller 10, an annular groove 14 is provided in the bearing roller. An endless drive belt 15, having a circular cross-section, travels in this groove 14. Rotation of the belt 15 causes rotation of the bearing roller 10, which motion is transmitted to the preforms 5. The pair of endless drive belts 15, having opposed major surfaces 15a, are tensioned through the intermediary of guide rollers 36, shown in FIG. 2, and are driven by stepless adjustable, synchronised, drive means 16 and 37.

The drive means 16 and 37 appropriately adjust the circumferential speed of the preforms 5 as they pass through the heating station 22, whereby an even distribution of temperature over the preforms 5 can be achieved.

In order to permit the width of the linear path 8 along which the preforms 5 are conveyed to be adjustable for example, to permit the apparatus to handle preforms 5 of different diameters, one or more spindle drive 41 are provided, which drives 41 are mounted on the basic frame 17.

The two toothed belts 1 and 2, the guide rollers 30 and 31, the guide rollers 36 for the drive belts 15 and the heating elements 38 of the heating arrangement are all mounted on the partially shown basic frame 17. Guide means 18 for the or each spindle drive 19 are also screw-connected to the frame 17.

When the spindle 19 is rotated by means of the handwheels 39, an axial movement is transmitted to a pair of guide means 18. By providing a left-hand thread on one-half of each spindle and a right-hand thread on the other half the guide means 18 are either jointly moved towards or away from one another. Accordingly, the width of the conveyor path 8 through which the preforms 5 pass can be steplessly adjusted.

In FIG. 4 there is shown a view similar to FIG. 3 of one-half of an alternative embodiment. The other half is identical. In this embodiment a guide rail 104 is mounted on the underside of a carrier member 117 forming part of the frame with metallic rods 118 being inserted into a groove formed on each side of the guide rail 104. Guide rollers 104b, which have guide grooves 104a formed therein, travel on the rods 118 and are mounted on a lug 106. The bearing roller axle 112 is mounted on the underside of the lug 106. A guide roller 104b is disposed on the other end of the axle 112 on the upper surface of the lug 106, in order to provide extremely accurate guidance.

At its lower end, the bearing roller axle 112 is provided with a bearing roller having a bearing ring 11 moulded to fit thereon for accommodating the support ring 5a of the preforms 5.

A butt shaft 119 is mounted on the upper surface of the bearing roller axle 112, above the lug 106 and the guide roller 104b, and a drive roller 110, having an annular groove 114 disposed therearound, is mounted on the butt shaft 119.

Figure 2:
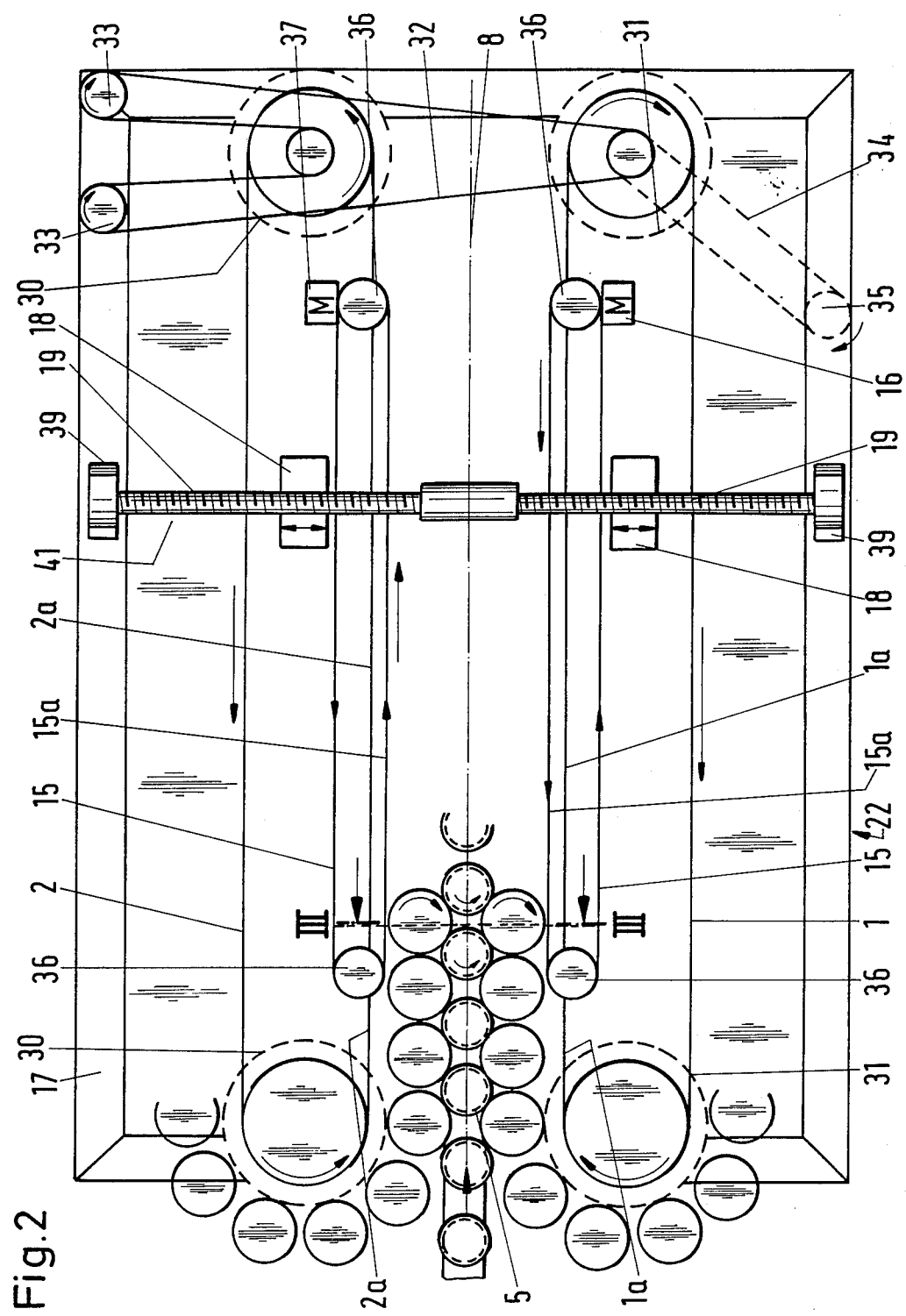
FIG. 2 is a plan view, on an enlarged scale relative thereto, of the conveyor arrangement shown in FIG. 1.

A circular, endless drive belt 115 travels in this annular groove 114 and rotates around guide rollers 136, which are similar to the guide rollers 36 shown in FIG. 2. The drive belt 115 is driven by drive means (not shown) and, in consequence, sets the butt shaft 119, the bearing roller axle 112 and the bearing roller with the bearing ring 11 rotating. This rotational movement is transmitted to the preforms 5. For an even distribution of temperature in the preforms, these latter are conducted through the heating station 22. The rotational speed is adjustable, as desired, by the stepless adjustment of the speed of rotation of the pertinent driving means.

In such an arrangement, the roller 110 provided with the annular groove 114, and the endless drive belt 115 are disposed at a considerable spacing from the heating element 38, so that the endless drive belts 115 do not become excessively heated in the event of a breakdown of the heating station.

We claim:

1. An apparatus for the conveying of preforms through a heating station during the production of hollow bodies formed from thermoplastic plastics material, said preforms each including a support ring or collar, said conveying apparatus comprising a housing and conveyor means disposed within said housing, said conveyor means comprising a pair of endless toothed belts, said pair of belts being disposed parallel to, but spaced apart from one another to define a conveyor path therebetween, drive means associated with each belt for driving said belts in opposite directions to one another, whereby the surfaces of said belts defining said path are caused to travel in the same direction as one another, means for adjusting said spacing of said belts from one another, a plurality of bearing assemblies fixedly mounted on each of said belts, each said bearing assembly including a bearing ring, whereby, in use, pairs of said assemblies, comprising one assembly from each belt, cooperate with one another and jointly support and convey said preforms by engagement, from opposed sides, with said support ring or collar, means for rotating said bearing rings, said means for rotating comprising a further pair of endless drive belts, said further pair of drive belts extending parallel to, but spaced apart from, one another and parallel to, but vertically spaced from, said pair of toothed belts, said further pair of belts being disposed one on each side of said conveyor path, drive means associated with each belt of said further pair of belts for driving said belts in the same direction as one another whereby the surfaces of said belts facing said conveyor path travel, in use, in opposite directions to one another, means for adjusting said drive means for said further pair of belts, drive roller means co-operating with each said belt of said further pair of belts, said drive roller means being connected to each said bearing ring, and heating means for heating said preforms during said conveyance, whereby actuation of said toothed pair of belts causes support and conveyance of said preforms along said conveyor path and simultaneous actuation of said further pair of drive belts causes rotation of said preforms about their own axis during said conveyance.

2. An apparatus as recited in claim 1, wherein said means for adjusting the mutual spacing of said toothed belts from one another comprises at least one spindle drive means, said spindle drive means extending horizontally and at right angles to conveyor path, said spindle drive means co-operating with said housing.

3. An apparatus as recited in claim 1, wherein each said bearing assembly comprises a retaining member mounted on said toothed belt, said retaining member including an upper surface, a cover plate disposed centrally on said upper surface of said retaining member, said cover plate having first and second opposed faces, guide roller means rotatably mounted on said first face of said cover plate remote from said conveyor path guide rail means guiding said guide roller means, said guide rail means drfining an external groove receiving said guide rollers, and bearing axle means mounting said bearing roller mounted on said second face of said cover plate.

4. An apparatus as recited in claim 1, wherein each said drive roller means defines an annular groove in its external surface and each said further drive belt has a circular cross-section, said further drive belts engaging in said annular grooves.

5. An apparatus as recited in claim 1, wherein the driving arrangement for rotating said preforms is disposed above said endless toothed belts.

* * * * *